(12) United States Patent
Dueck et al.

(10) Patent No.: US 7,228,806 B2
(45) Date of Patent: Jun. 12, 2007

(54) BIOMASS GASIFICATION SYSTEM

(75) Inventors: Raymond Dueck, Arborg (CA); Maciej G. Wierzbowski, Winnipeg (CA)

(73) Assignee: Vidir Machine, Inc., Arborg, Manitoba (CA)

( * ) Notice: Subject to any disclaimer, the term of this patent is extended or adjusted under 35 U.S.C. 154(b) by 0 days.

(21) Appl. No.: 10/608,443

(22) Filed: Jun. 26, 2003

(65) Prior Publication Data

US 2004/0261670 A1    Dec. 30, 2004

(51) Int. Cl.
*F23D 1/00*   (2006.01)
*F23G 7/10*   (2006.01)
*F23G 7/00*   (2006.01)

(52) U.S. Cl. .................. 110/266; 110/247; 110/165 R; 110/229

(58) Field of Classification Search ................ 110/222, 110/229, 230, 231, 289, 247, 109, 165 R
See application file for complete search history.

(56) References Cited

U.S. PATENT DOCUMENTS

| | | | | |
|---|---|---|---|---|
| 1,709,902 | A | * | 4/1929 | Fahnestock ................. 110/277 |
| 1,888,439 | A | * | 11/1932 | Stolte ......................... 110/191 |
| 2,171,535 | A | * | 9/1939 | Ragnar et al. .............. 110/225 |
| 2,375,436 | A | * | 5/1945 | Gustav .................... 110/165 R |
| 2,971,480 | A | * | 2/1961 | Sage ........................... 110/265 |
| 4,014,664 | A | * | 3/1977 | Kupfer et al. ................. 48/63 |
| 4,498,909 | A | * | 2/1985 | Milner et al. ................ 48/209 |
| 4,846,082 | A | * | 7/1989 | Marangoni ................... 110/234 |
| 4,971,599 | A | * | 11/1990 | Cordell et al. ................. 48/76 |
| 5,022,329 | A | * | 6/1991 | Rackley et al. ............. 110/234 |
| 5,026,403 | A | * | 6/1991 | Michel-Kim ................. 48/203 |
| 5,197,684 | A | * | 3/1993 | Bihlet et al. ................ 241/283 |
| 5,823,122 | A | * | 10/1998 | Chronowski et al. ....... 110/346 |

* cited by examiner

*Primary Examiner*—Kenneth Rinehart
(74) *Attorney, Agent, or Firm*—Michael S. Neustel

(57) ABSTRACT

A biomass gasification system for efficiently extracting heat energy from biomass material. The biomass gasification system includes a primary combustion chamber, a rotating grate within the primary combustion chamber for supporting the biomass during gasification, a feeder unit in communication with the primary combustion chamber for delivering biomass, a secondary combustion chamber fluidly connected to the primary combustion chamber, an oxygen mixer positioned between the primary combustion chamber and the secondary combustion chamber, a heat exchanger and an exhaust stack.

2 Claims, 10 Drawing Sheets

BIOMASS GASIFICATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to biomass gasification and more specifically it relates to a biomass gasification system for efficiently extracting heat energy from biomass material.

2. Description of the Related Art

Biomass gasification processes have been in use for years for converting biomass into an energy source. Biomass gasification applications include water boiling, steam generation, drying, motive power applications (e.g. using the producer gas as a fuel in internal combustion engines), and electricity generation.

Almost all kinds of biomass with moisture content of 5–30% can be gasified. Examples of suitable biomass include forest slash, urban wood waste, lumber waste, wood chips, sawdust, straw, firewood, agricultural residue, dung and the like. Under controlled conditions, characterized by low oxygen supply and high temperatures, most biomass materials can be converted into a gaseous fuel known as "producer gas", which consists of combustible mixture of nitrogen, carbon monoxide, and hydrogen. This thermochemical conversion of solid biomass into gaseous fuel is called biomass gasification.

Biomass gasification has many of the advantages associated with using gaseous and liquid fuels such as clean combustion, compact burning equipment, high thermal efficiency and a good degree of control. In locations where biomass is already available at reasonable low prices (e.g. agricultural areas) or in industries using fuel wood, biomass gasifier systems offer definite economic advantages. Biomass gasification technology is also environment-friendly, because of the fuel savings and reduction in $CO_2$ emissions.

The main problems with the application of biomass gasification systems have been economic, not technical. For example, conventional biomass gasification systems are typically suitable only for large-scale operations and not small-scale operations. Also, the product from gasification is mainly a heat source, and the low value of these products in today's market is insufficient to justify the capital and operating costs of conventional biomass gasification systems. Hence, there is a need for a biomass gasification system that is efficient and cost effective to operate with low cost biomass.

An example of a patented device this is related to the present invention is illustrated in U.S. Pat. No. 2,171,535 to Berg et al. for an incineration system for disposal of refuse having high moisture content. However, the Berg et al. patent reference does not have a piston feeder structure, a rotating grate within the primary combustion chamber, a silica collector system nor an oxygen mixer between the primary combustion chamber and the secondary combustion chamber.

While these devices may be suitable for the particular purpose to which they address, they are not as suitable for efficiently extracting heat energy from biomass material. Conventional biomass apparatus do not efficiently extract heat energy from the biomass material.

In these respects, the biomass gasification system according to the present invention substantially departs from the conventional concepts and designs of the prior art, and in so doing provides an apparatus primarily developed for the purpose of efficiently extracting heat energy from biomass material.

BRIEF SUMMARY OF THE INVENTION

In view of the foregoing disadvantages inherent in the known types of gasification apparatus now present in the prior art, the present invention provides a new biomass gasification system construction wherein the same can be utilized for efficiently extracting heat energy from biomass material.

The general purpose of the present invention, which will be described subsequently in greater detail, is to provide a new biomass gasification system that has many of the advantages of the gasification apparatus mentioned heretofore and many novel features that result in a new biomass gasification system which is not anticipated, rendered obvious, suggested, or even implied by any of the prior art gasification apparatus, either alone or in any combination thereof.

To attain this, the present invention generally comprises a primary combustion chamber, a rotating grate within the primary combustion chamber for supporting the biomass during gasification, a feeder unit in communication with the primary combustion chamber for delivering biomass, a secondary combustion chamber fluidly connected to the primary combustion chamber, an oxygen mixer positioned between the primary combustion chamber and the secondary combustion chamber, a heat exchanger and an exhaust stack.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a biomass gasification system that will overcome the shortcomings of the prior art devices.

A second object is to provide a biomass gasification system for efficiently extracting heat energy from biomass material.

Another object is to provide a biomass gasification system that provides for usage of biomass gasification technologies within small-scale operations.

An additional object is to provide a biomass gasification system that is capable of utilizing various types of biomass materials readily available.

A further object is to provide a biomass gasification system that provides a cost effective alternative fuel source compared to conventional fossil fuels.

Another object is to provide a biomass gasification system that is environmentally friendly and utilizes renewable resources.

A further object is to provide a biomass gasification system that has efficiency ratings approaching 85%.

Another object is to provide a biomass gasification system that is automated and requires reduced maintenance.

A further object is to provide a biomass gasification system that may be utilized to produce beat, mechanical power or electricity.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
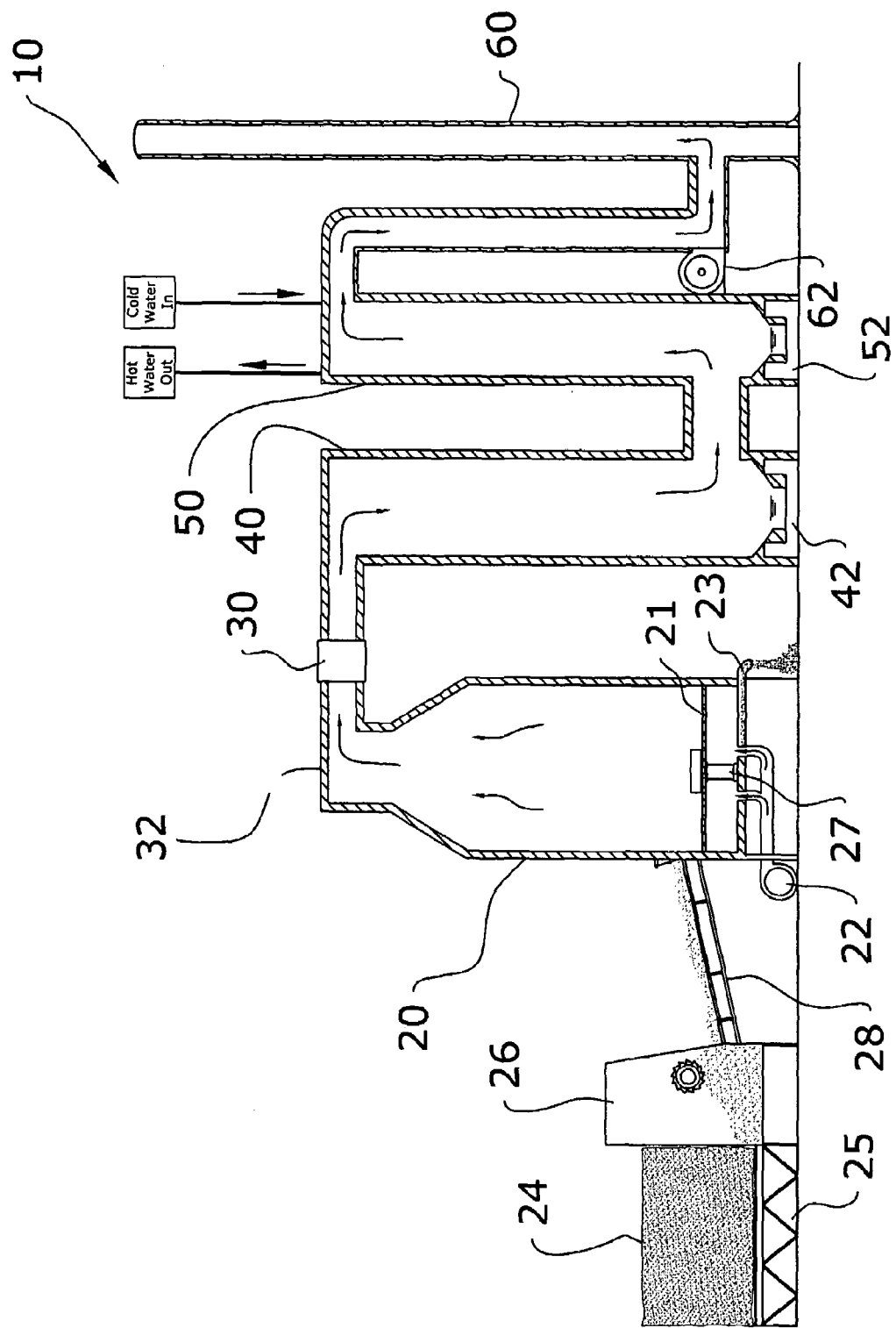
FIG. 1 is a side cutaway view of the present invention.
Figure 2:
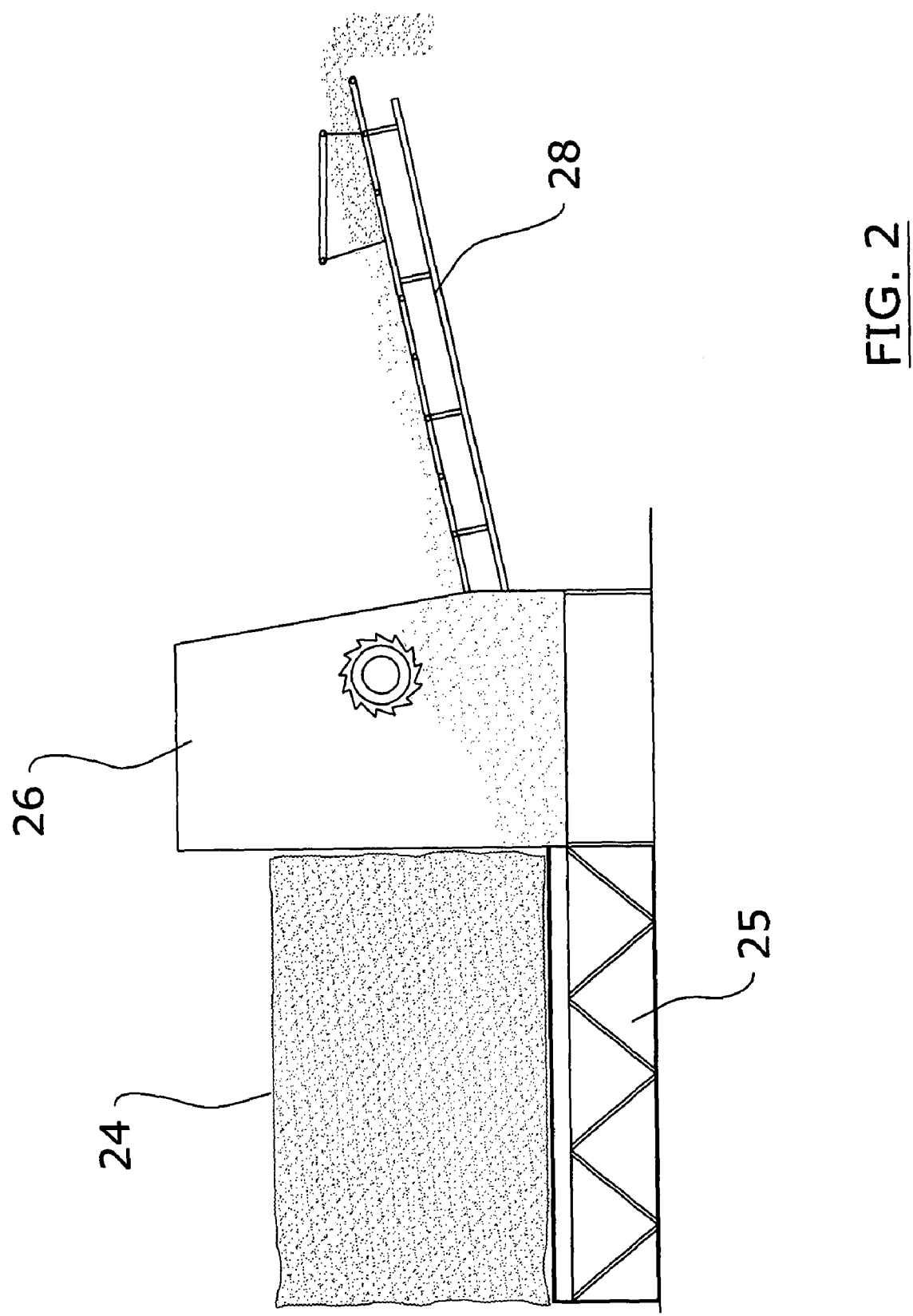
FIG. 2 is a side view of the fuel magazine and disintegration unit.

Turning now descriptively to the drawings, in which similar reference characters denote similar elements throughout the several views, FIGS. 1 through 10 illustrate a biomass gasification sysem 10, which comprises a primary combustion chamber 20, a rotating grate 21 within the primary combustion chamber 20 for supporting the biomass during gasification, a feeder unit 70 in communication with the primary combustion chamber 20 for delivering biomass, a secondary combustion chamber 40 fluidly connected to the primary combustion chamber 20, an oxygen mixer 30 positioned between the primary combustion chamber 20 and the secondary combustion chamber 40, a heat exchanger 50 and an exhaust stack 60.

B. Primary Combustion Chamber

Figure 3:
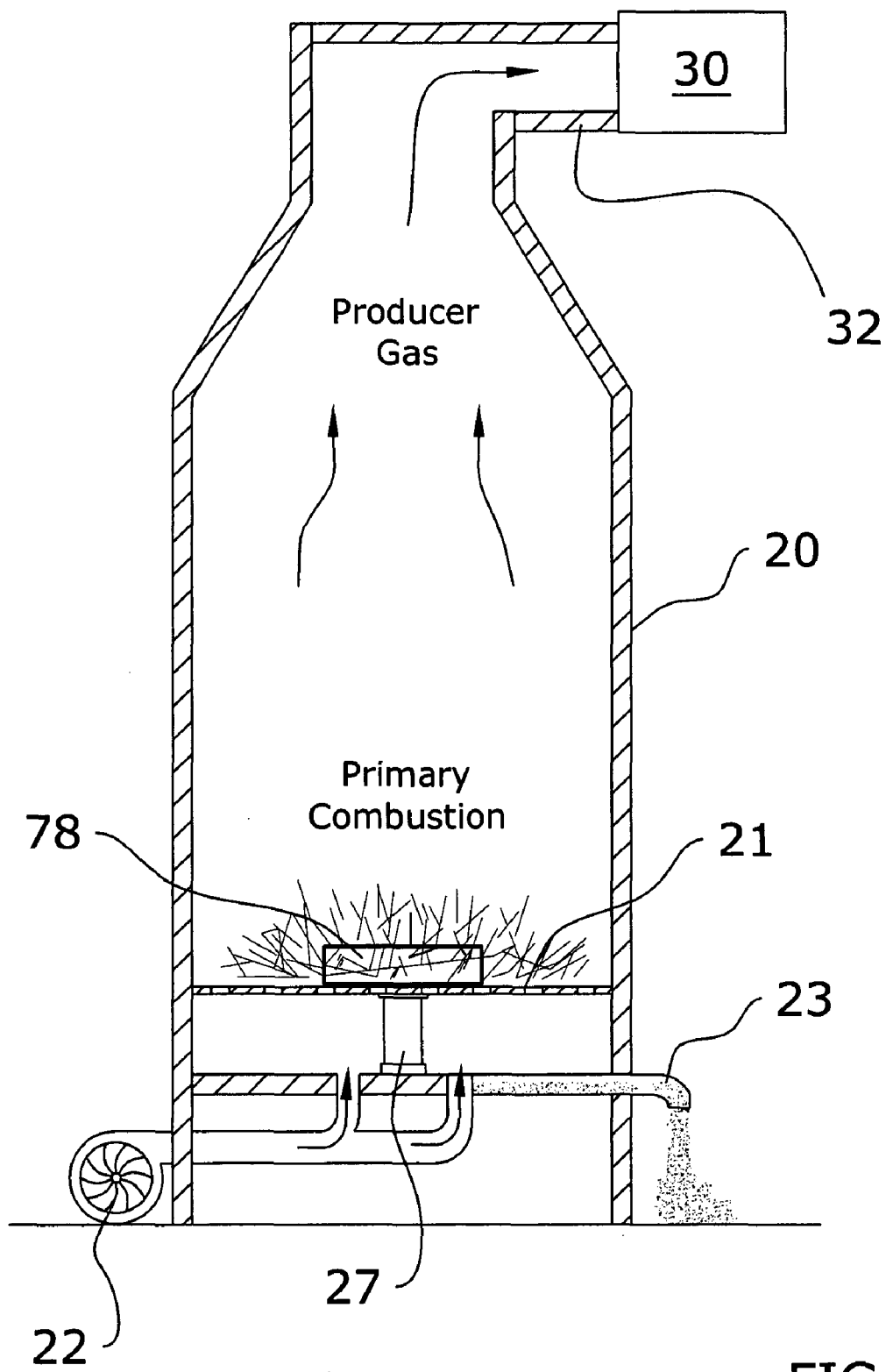
FIG. 3 is a side cutaway view of the primary combustion chamber.
Figure 8:
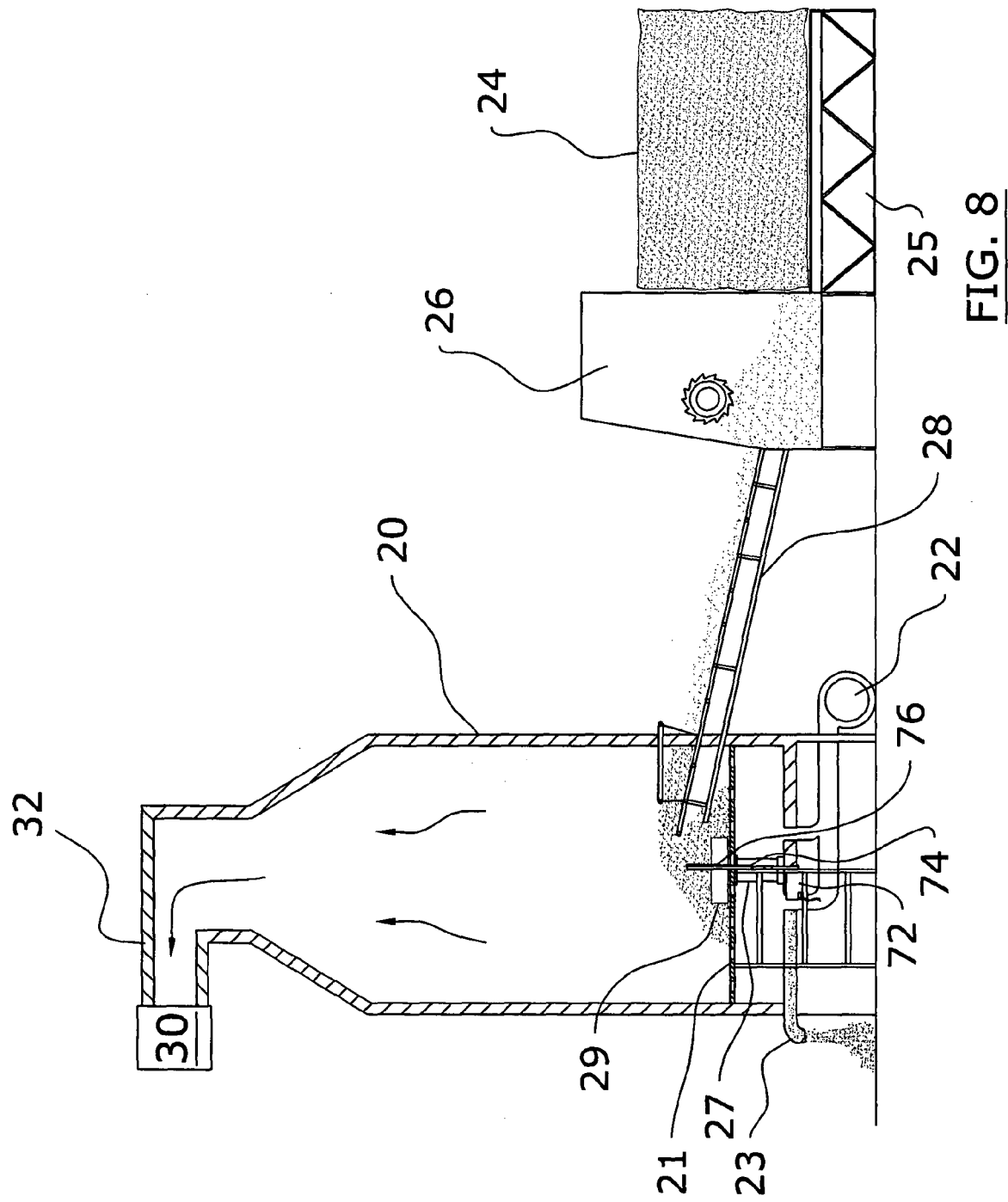
FIG. 8 is a side cutaway view of the primary combustion chamber with the fuel conveyor and disintegration unit.
Figure 9:
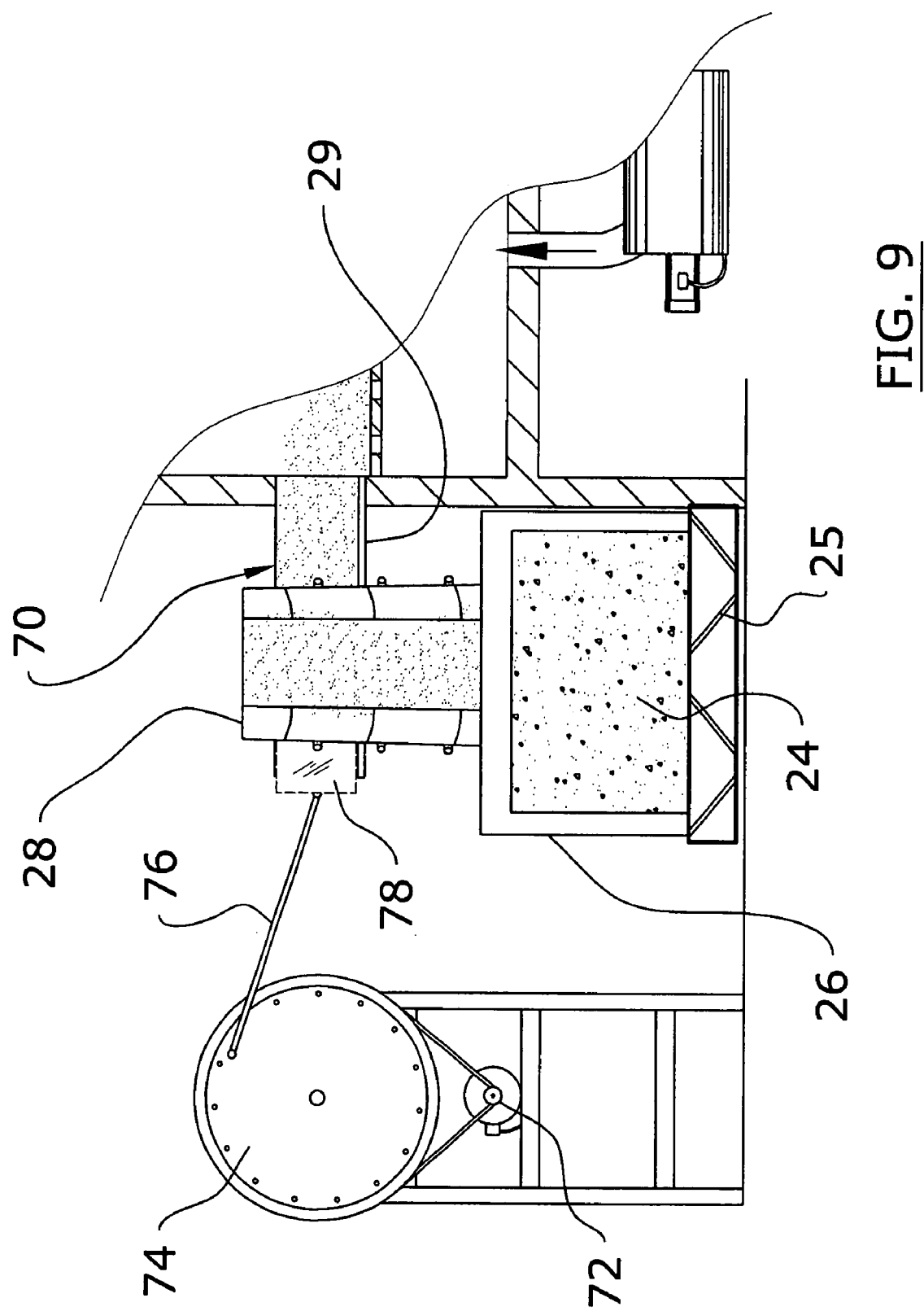
FIG. 9 is a magnified side view of the fuel conveyor feeding biomass into the feeder unit.

The primary combustion chamber 20 is where the primary combustion occurs thereby converting the biomass to a producer gas as shown in FIGS. 1, 3 and 8 of the drawings. The primary combustion chamber 20 may be comprised of various structures commonly utilized within the gasification industry.

The interior portion of the primary combustion chamber 20 is preferably circular for receiving the rotating grate 21, however various other interior cross sectional shapes may be utilized to construct the primary combustion chamber 20. The primary combustion chamber 20 is preferably formed for gasifying various types of biomass such as but not limited to forest slash, urban wood waste, lumber waste, wood chips, sawdust, straw, firewood, agricultural residue, dung and the like.

As shown in FIGS. 1 and 3 of the drawings, an ash disposal unit 23 is preferably positioned beneath the rotating grate 21 for removing collected ash from the primary combustion chamber 20. The ash disposal unit 23 may be comprised of any well-known technology capable of removing ash from the primary combustion chamber 20.

C. Rotating Grate

As shown in FIGS. 1, 3 and 8 of the drawings, the rotating grate 21 is rotatably positioned within a lower portion of the primary combustion chamber 20 for supporting the biomass during gasification. The rotating grate 21 preferably has a flat structure, however various other structures may be utilized to construct the rotating grate 21. The rotating grate 21 may be comprised of various rigid materials capable of withstanding high temperatures such as but not limited to metal.

The rotating grate 21 preferably includes a plurality of openings within it for allowing air to pass upwardly through the biomass positioned upon the rotating grate 21 thereby feeding the primary combustion. The openings within the rotating grate 21 may have various sizes, shapes and patterns that allow air to pass through into the biomass as can be appreciated.

The rotating grate 21 preferably has a shape and size similar to an interior of the primary combustion chamber 20 thereby preventing biomass from falling between the outer perimeter of the rotating grate 21 and the inner wall of the primary combustion chamber 20. The rotating grate 21 is rotatably supported within the lower portion of the primary combustion chamber 20 utilizing a support structure within the primary combustion chamber 20. The rotating grate 21 preferably is substantially transverse with respect to a longitudinal axis of the primary combustion chamber 20 as shown in FIGS. 1, 3 and 8 of the drawings.

In addition, a drive motor 27 is mechanically connected to the rotating grate 21 for rotating the rotating grate 21. The drive motor 27 may be comprised of any well-known motor structure such as electric, hydraulic and the like. The drive motor 27 may be mechanically connected to the rotating grate 21 via various conventional connection means such as gears, chains, drive shaft 76 and the like.

As shown in FIGS. 1 and 3 of the drawings, an air distribution system 22 is positioned within the primary combustion chamber 20 beneath the rotating grate 21 for forcing air beneath the rotating grate 21 through the openings. The air distribution system 22 draws fresh air from outside of the primary combustion chamber 20 into the primary combustion area to assist in increasing the temperature of the primary combustion. The air distribution system 22 may be comprised of various devices capable of forcing air into the primary combustion chamber 20.

D. Feeder Unit

The feeder unit 70 is in communication with the primary combustion chamber 20 for delivering biomass onto the rotating grate 21 as shown in FIGS. 1 and 8 of the drawings. The feeder unit 70 preferably includes a disintegration unit 26 for disintegrating the biomass before entering the primary combustion chamber 20, thereby increasing the rate of breakdown for the biomass within the primary combustion chamber 20.

The feeder unit 70 also preferably includes a biomass magazine 25 capable of storing a volume of the biomass for inputting biomass into the disintegration unit 26. For example, if straw bales are used in the present invention as the biomass, then the biomass magazine 25 would be capable of delivering bales of the straw into the disintegration upon demand. A biomass storage bin 24 stores a volume of the biomass prior to entering the biomass magazine 25. The biomass storage bin 24 may be capable of storing various volumes of biomass.

Figure 7A:
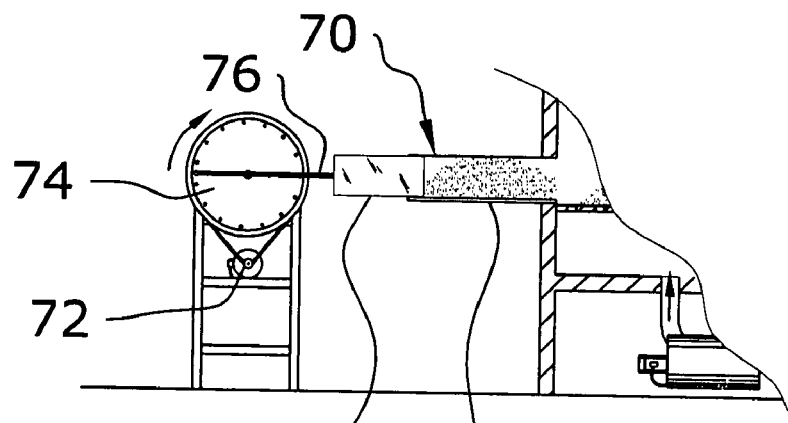
FIGS. 7a–7c illustrate the operation of the feeder unit.
Figure 7B:
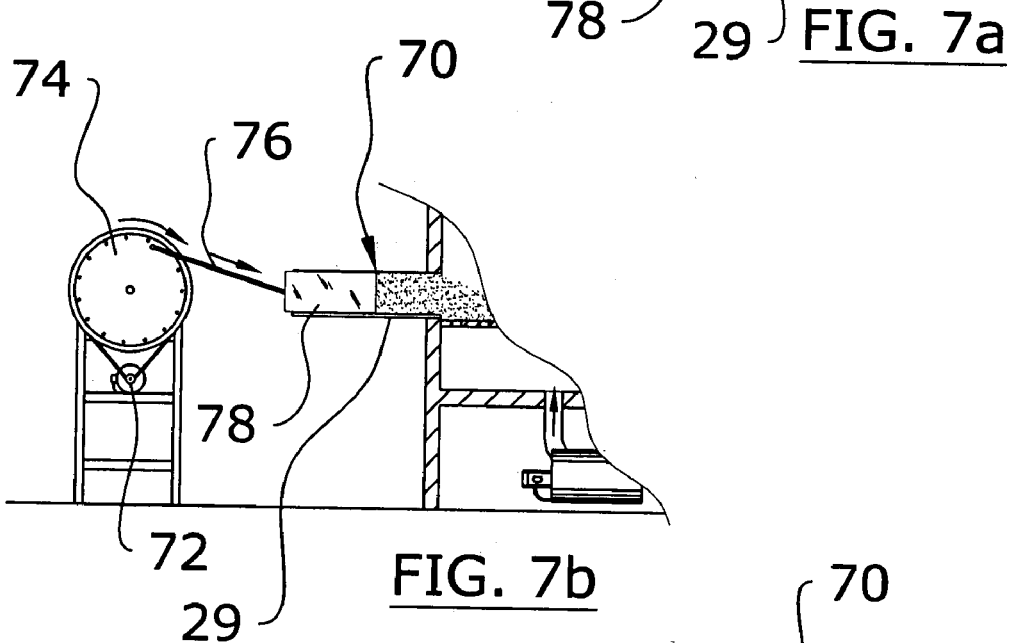
Figure 7C:
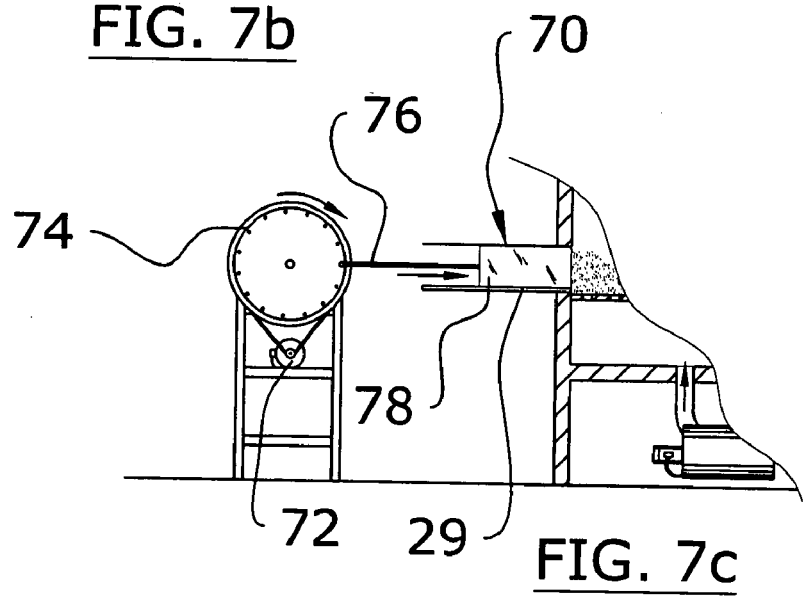

As shown in FIGS. 7a–7c of the drawings, the feeder unit 70 preferably includes a plunger member 78 that pushes the biomass into an opening surrounded by an input member 29 within the primary combustion chamber 20 onto the rotating grate 21. The plunger member 78 is slidably positioned within the input member 29 as illustrated in FIGS. 7a–7c of the drawings.

The opening within the primary combustion unit is preferably aligned with or slightly above the upper surface of the rotating grate 21 as shown in FIGS. 7a–7c and 9 of the drawings. The input member 29 is preferably comprised of a tubular structure that allows forcing of the biomass into the primary combustion chamber 20 as shown in FIGS. 7a–7c of the drawings.

The plunger member 78 moves along a path radial to the rotating grate 21 and has a cyclical action. The cyclical action of the plunger member 78 allows for new biomass to be inserted into the primary combustion chamber 20 as the rotating grate 21 rotates. As the new biomass is forced onto the rotating grate 21, the remaining biomass is forced inwardly and the ashes pass through the rotating grate 21 to allow for the new biomass.

The feeder unit 70 preferably includes a conveyor 28 positioned between the disintegration unit 26 and the primary combustion chamber 20 for transferring the particulate biomass into the primary combustion chamber 20. The conveyor 28 positions the new biomass into an upper opening within the input member 29 where after the plunger member 78 drives the biomass into the primary combustion chamber 20.

Various well-known mechanical devices may reciprocally drive the plunger member 78. A suitable mechanical device for driving the plunger member 78 is comprised of a flywheel 74 connected to a motor unit 72 and a drive shaft 76 attached to an outer portion of the flywheel 74 and to the plunger member 78. Various other devices may be utilized to drive the plunger member 78. In addition, various other structures may be utilized to input the biomass into the primary combustion chamber 20 instead of the plunger member 78.

E. Oxygen Mixer

The oxygen mixer 30 is positioned between the primary combustion chamber 20 and the secondary combustion chamber 40 as best shown in FIG. 1 of the drawings. The oxygen mixer 30 is in communication with the control unit 12 and allows a desired volume of oxygen or air into the transfer tube 32 positioned between the primary combustion chamber 20 and the secondary combustion chamber 40. The transfer tube 32 preferably has a cross section substantially smaller than the primary combustion chamber 20 to create a high velocity jet stream of producer gas entering the secondary combustion chamber 40.

The oxygen mixer 30 preferably inputs the oxygen into the producer gas emitted from the biomass in the primary combustion chamber 20 to increase the temperature of the secondary combustion to 2,000+ degrees Fahrenheit. As the producer gas increases in volume and velocity, the oxygen mixer 30 ensures that sufficient oxygen exists prior to entering the secondary combustion within the upper portion of the secondary combustion chamber 40.

F. Secondary Combustion Chamber

The secondary combustion chamber 40 is fluidly connected to the primary combustion chamber 20 via the transfer tube 32 at the upper portions thereof as best shown in FIG. 1 of the drawings. The second combustion chamber preferably has a substantially smaller cross section than the primary combustion chamber 20 for increasing the velocity of the gases.

As the producer gas and oxygen enter the upper portion of the second combustion chamber, a secondary combustion is formed that can exceed 2,000+ degrees Fahrenheit. At this temperature, contaminants and other material are burned completely thereby providing a clean and reduced pollution exhaust.

Figure 4:
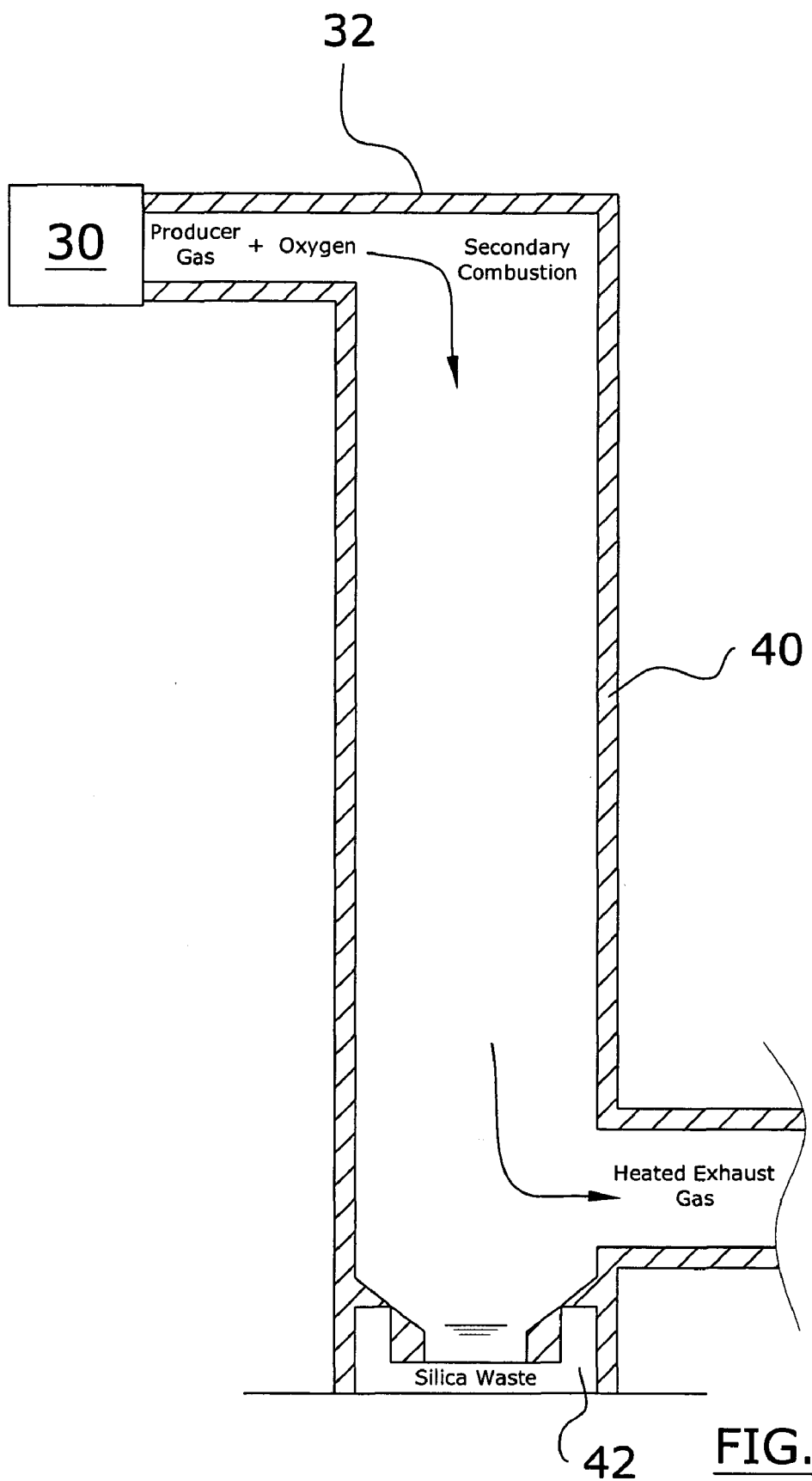
FIG. 4 is a side cutaway view of the secondary combustion chamber.

In addition, silica in the form of liquid typically is formed on the inner walls of the secondary combustion chamber 40 that is collected within the silica collector 42 at the bottom of the secondary combustion chamber 40 as shown in FIGS. 1 and 4 of the drawings. The silica may be collected into various types of containers such as but not limited to carts.

Alternatively, a liquid may be positioned within the silica container that pulverizes the silica chunks that fall into at an extreme temperature, where after the silica debris may be cleaned from the liquid. The silica collector 42 prevents the buildup of silica within the secondary combustion chamber 40 when straw and similar biomass are utilized with relatively high silica content.

G. Heat Exchanger

Figure 5:
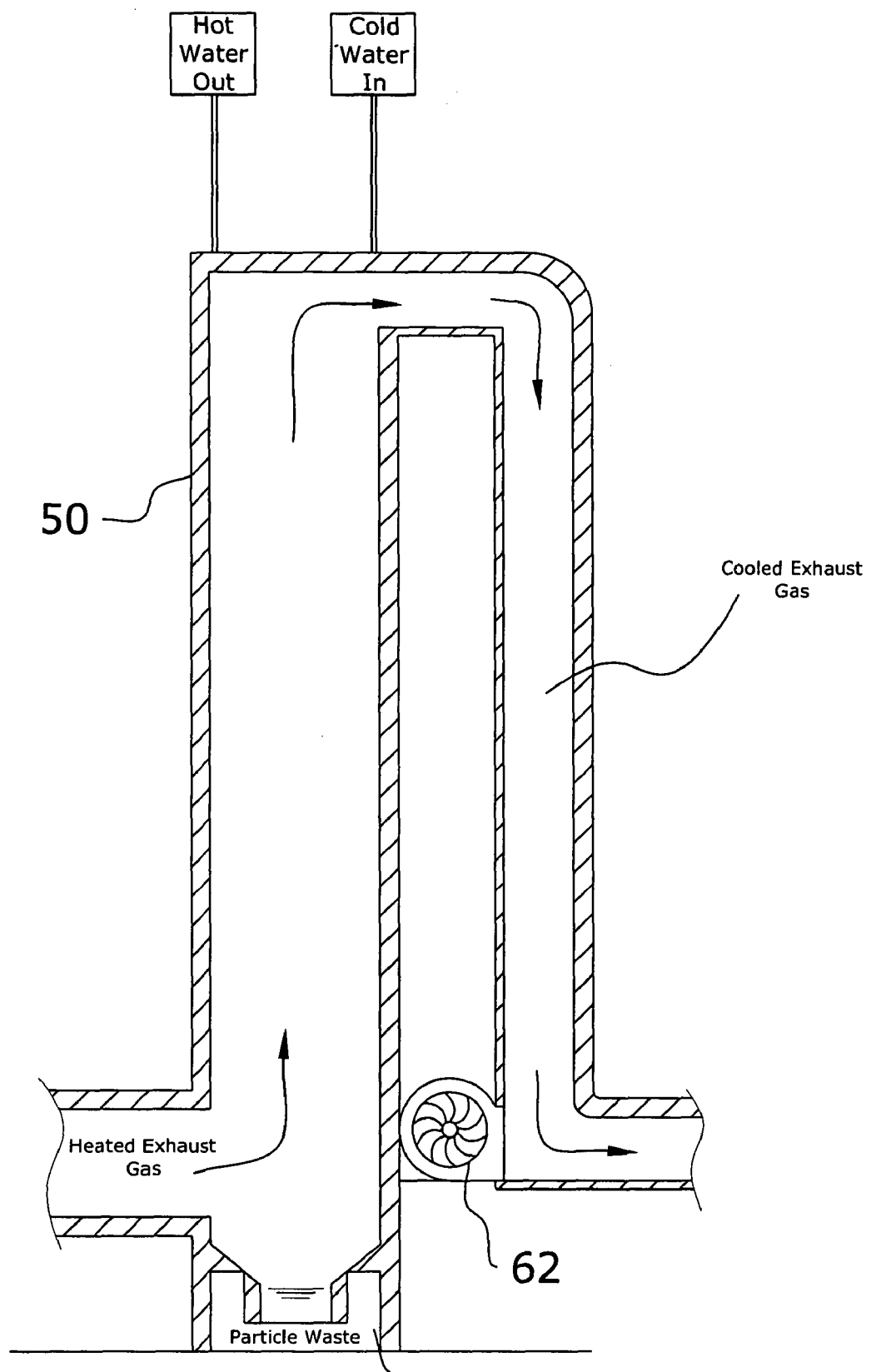
FIG. 5 is a side cutaway view of the heat exchanger.
Figure 6:
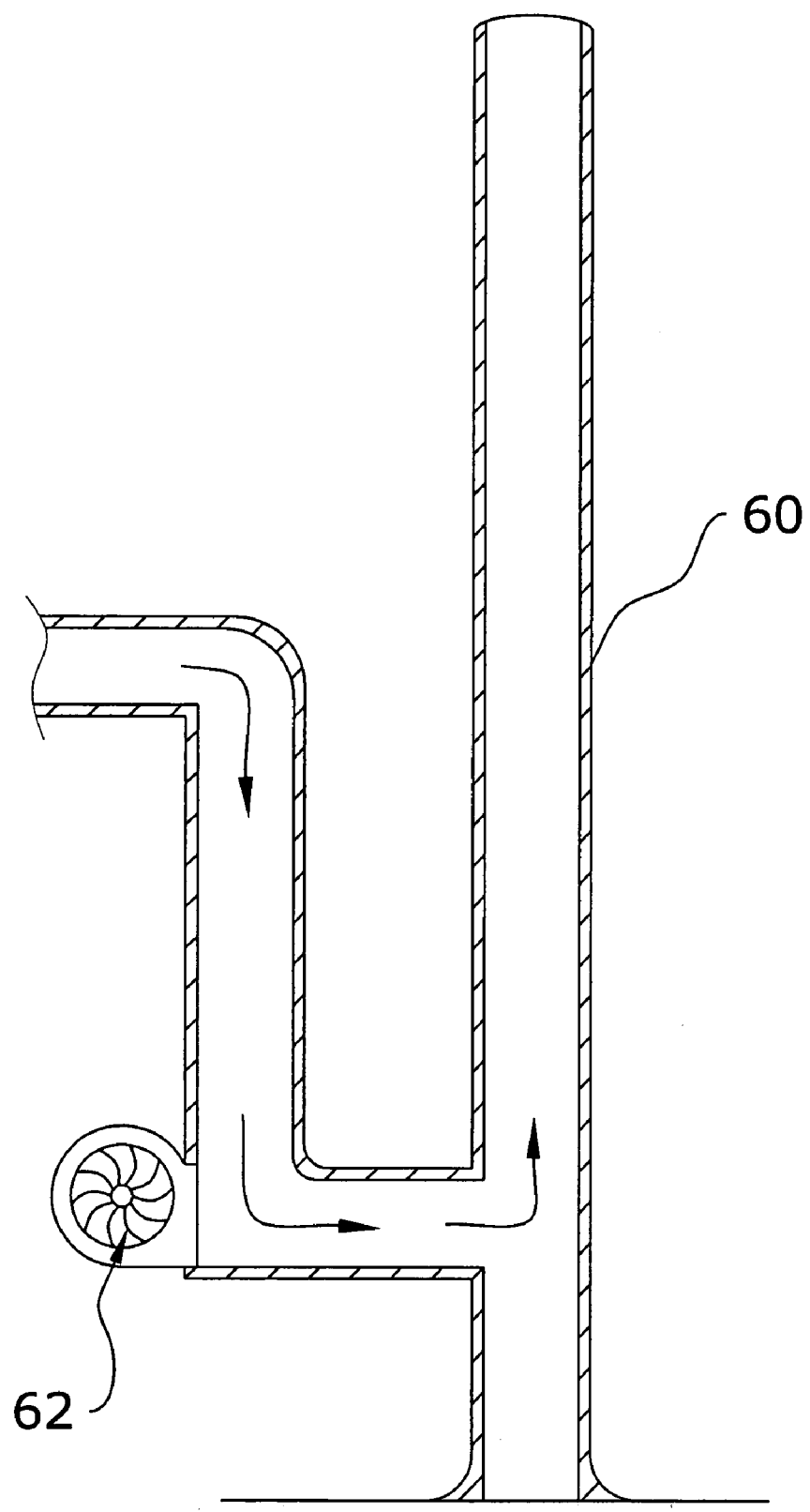
FIG. 6 is a side cutaway view of the exhaust stack.

The heat exchanger 50 is fluidly connected to a lower portion of the secondary combustion chamber 40 as best shown in FIGS. 1 and 5 of the drawings. The heat exchanger 50 preferably includes a particle collector 52 for collecting particle waste remaining within the exhaust of the secondary combustion that falls downwardly from within the heat exchanger 50.

It can be appreciated that a conventional heat exchanger 50 may be utilized that allows cool water to enter into pipes within the heat exchanger 50 that conduct the heat from the highly heated exhaust gas. The hot water then exits the heat exchanger 50 for use in producing electricity, heat for thermal applications and the like.

The preferred structure for a heat exchanger 50 is shown in FIG. 5 wherein a fluid tank retaining a volume of water or other liquid has a plurality of exhaust pipes passing through thereof. The heated exhaust gas passes through the exhaust pipes within the fluid tank thereby heating the liquid within the fluid tank. An auger structure is utilized to remove collected particle waste from within the interior of the exhaust pipes.

H. Control Unit

Figure 10:
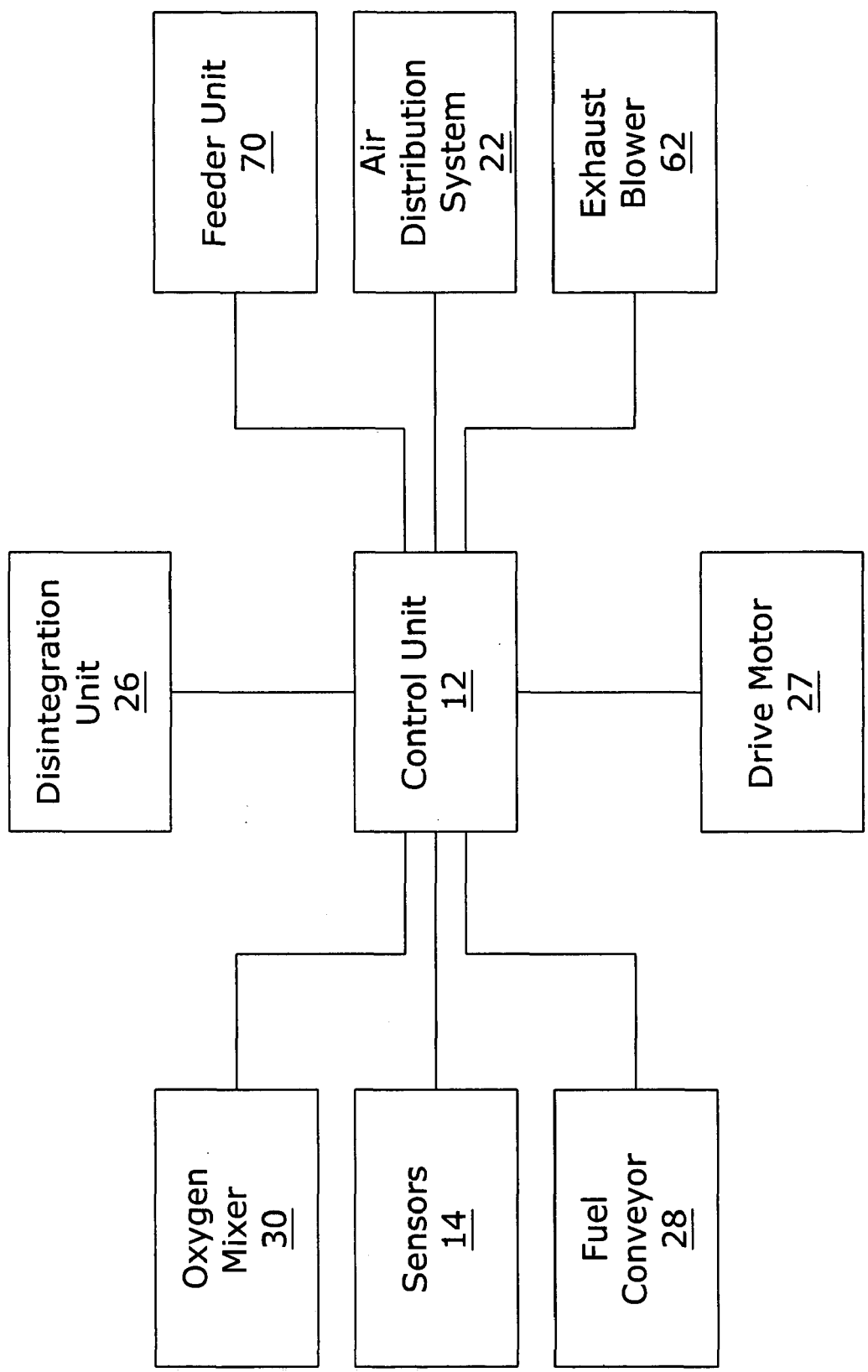
FIG. 10 is a block diagram illustrating the overall control system for the present invention.

As shown in FIG. 10 of the drawings, the control unit 12 is in communication with the oxygen mixer 30, the disintegration unit 26, the feeder unit 70, the air distribution system 22, the exhaust blower 62, the drive motor 27 and the fuel conveyor 28. The control unit 12 may be in communication with these devices via direct electrical connection, radio signal or other communication means.

The control unit 12 also is in communication with various sensors 14 within the primary combustion chamber 20, the secondary combustion chamber 40, the heat exchanger 50 and the exhaust stack 60 to monitor the performance of the system and adjust the components accordingly. The control unit 12 may be comprised of a computer or other electronic device capable of storing various types of data including input data, program data and the like.

I. Operation

In use, the biomass is loaded within the biomass storage bin 24. The biomass is then automatically loaded into the biomass magazine 25 which then feeds the biomass into the disintegration unit 26. The broken down biomass is then transferred along the conveyor 28 into the primary combustion chamber 20. The biomass is fed into the input member 29 where after the plunger member 78 forces the biomass into the primary combustion chamber 20 onto the rotating grate 21 as shown in FIGS. 7a–7c of the drawings. The new biomass within the primary combustion chamber 20 is thereafter broken down by the primary combustion within the primary combustion chamber 20 into producer gas. The producer gas rises to the upper portion of the interior of the primary combustion chamber 20 and then enters the transfer tube 32. As the producer gas passes through the transfer tube 32 a high velocity, the oxygen mixer 30 inputs oxygen within the producer gas which is then dispersed into the upper portion of the secondary combustion chamber 40 where the secondary combustion occurs at a high temperature (exceeding 2,000 degree Fahrenheit). Silica and other debris is collected within the silica collector 42 at the bottom of the secondary combustion chamber 40. The super heated exhaust gas then enters the heat exchanger 50 to heat a liquid or perform another function for transferring the heat energy. The cooled exhaust gas thereafter passes downwardly to a lower portion of an exhaust stack 60 where an exhaust blower 62 assists in transferring the cooled exhaust gas outwardly through the exhaust stack 60.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A biomass gasification system designed for combusting biomass material containing silica including straw, comprising:
   a fuel magazine capable of storing a volume of said biomass material;
   a disintegration unit in communication with said fuel magazine to receive said biomass material from said fuel magazine;
   a primary combustion chamber creating a primary combustion of biomass material to create a producer gas, wherein said biomass material contains silica;
   a mechanical agitator within said primary combustion chamber to mix said biomass material during said primary combustion;
   a feeder unit including a conveyor in communication with said primary combustion chamber for delivering biomass material from said disintegration unit into said primary combustion chamber;
   an air distribution system for forcing air beneath said rotating grate through said plurality of openings;
   an ash disposal unit positioned beneath said mechanical agitator for removing collected ash from said primary combustion chamber;
   a secondary combustion chamber containing a secondary combustion of said producer gas, wherein said second combustion chamber is fluidly connected to said primary combustion chamber;
   an oxygen mixer fluidly connected between said primary combustion chamber and said secondary combustion chamber to introduce additional oxygen into said producer gas emitted from said biomass material to increase a temperature of said second combustion to at least 2,000 degrees Fahrenheit;
   a heat exchanger fluidly connected to said secondary combustion chamber; and
   a silica collector positioned at a bottom of said secondary combustion chamber for collecting liquid silica, wherein silica collects on an inner wall of said secondary combustion chamber and drains into said silica collector.

2. A biomass gasification system designed for combusting biomass material containing silica including straw, comprising:
   a fuel magazine capable of storing a volume of said biomass material;
   a disintegration unit in communication with said fuel magazine to receive said biomass material from said fuel magazine;
   a primary combustion chamber creating a primary combustion of biomass material to create a producer gas, wherein said biomass material contains silica;
   an agitator within said primary combustion chamber to mix said biomass material during said primary combustion;
   wherein said agitator is comprised of a rotating grate rotatably positioned within said primary combustion chamber for supporting said biomass material during gasification and a drive motor mechanically connected to said rotating grate for rotating said rotating grate;
   a feeder unit including a conveyor in communication with said primary combustion chamber for delivering biomass material from said disintegration unit into said primary combustion chamber and onto said rotating grate;

wherein said feeder unit includes a plunger member to push said biomass material through an opening within said primary combustion chamber onto said rotating grate;

wherein said rotating grate includes a plurality of openings for allowing air to pass upwardly through said biomass material positioned upon said rotating grate;

an air distribution system for forcing air beneath said rotating grate through said plurality of openings;

an ash disposal unit positioned beneath said rotating grate for removing collected ash from said primary combustion chamber;

a secondary combustion chamber containing a secondary combustion of said producer gas, wherein said second combustion chamber is fluidly connected to said primary combustion chamber;

an oxygen mixer fluidly connected between said primary combustion chamber and said secondary combustion chamber to introduce additional oxygen into said producer gas emitted from said biomass material to increase a temperature of said second combustion to at least 2,000 degrees Fahrenheit;

a heat exchanger fluidly connected to said secondary combustion chamber;

a silica collector positioned at a bottom of said secondary combustion chamber for collecting liquid silica, wherein silica collects on an inner wall of said secondary combustion chamber and drains into said silica collector, wherein said silica collector is comprised of a cart; and a volume of liquid within said silica collector.

* * * * *